US012410080B2

(12) United States Patent
Rhu et al.

(10) Patent No.: US 12,410,080 B2
(45) Date of Patent: Sep. 9, 2025

(54) WASTEWATER FILTERING METHOD AND APPARATUS COMPRISING FILTER MEDIA OF DIFFERENT SIZES

(71) Applicant: TOMORROW WATER, Anaheim, CA (US)

(72) Inventors: Dae Hwan Rhu, Yeoju-si (KR); Bong Choel Choi, Daejeon (KR); Chun Woo Lee, Busan (KR); Yong Joon Yune, Sejong (KR); Jong Goo Kim, Daejeon (KR); Byung Suk Lee, Daejeon (KR); Kyoung Hwan Sung, Daejeon (KR)

(73) Assignee: TOMORROW WATER, Anaheim, CA (US)

( * ) Notice: Subject to any disclaimer, the term of this patent is extended or adjusted under 35 U.S.C. 154(b) by 194 days.

(21) Appl. No.: 17/927,897

(22) PCT Filed: Mar. 23, 2021

(86) PCT No.: PCT/KR2021/003601
§ 371 (c)(1),
(2) Date: Nov. 28, 2022

(87) PCT Pub. No.: WO2021/246626
PCT Pub. Date: Dec. 9, 2021

(65) Prior Publication Data
US 2023/0202891 A1 Jun. 29, 2023

(30) Foreign Application Priority Data

Jun. 2, 2020 (KR) .................. 10-2020-0066398
Jun. 2, 2020 (KR) .................. 10-2020-0066423
Jun. 2, 2020 (KR) .................. 10-2020-0066443

(51) Int. Cl.
*C02F 3/20* (2023.01)
*C02F 3/10* (2023.01)

(52) U.S. Cl.
CPC . *C02F 3/20* (2013.01); *C02F 3/10* (2013.01)

(58) Field of Classification Search
CPC .... C02F 3/20; C02F 3/10; C02F 3/087; C02F 3/06; C02F 3/104; C02F 2101/30; C02F 2103/001; C02F 2209/38; C02F 2209/40; C02F 2303/16; B01D 24/4621;
(Continued)

(56) References Cited

FOREIGN PATENT DOCUMENTS

| CN | 206008131 U | 3/2017 |
|---|---|---|
| JP | 2000-084309 A | 3/2000 |
| JP | 2005-262009 A | 9/2005 |

(Continued)

OTHER PUBLICATIONS

Translation of Choi (KR101557372B1) (Year: 2015).*
(Continued)

*Primary Examiner* — Ekandra S. Miller-Cruz
(74) *Attorney, Agent, or Firm* — Dinsmore & Shohl LLP; Yongsok Choi, Esq.

(57) ABSTRACT

Disclosed are a wastewater filtering method and apparatus comprising filter media of different sizes. According to one aspect of the present embodiment, provided a wastewater filtering method and apparatus capable of stable and efficient operation by minimizing the head loss as well as simultaneously removing organic matter and solids in a large flow of wastewater.

2 Claims, 12 Drawing Sheets

(58) Field of Classification Search
CPC .... B01D 24/4626; B01D 24/38; B01D 24/46;
B01D 24/16; Y02W 10/10
USPC ........................................................ 210/620
See application file for complete search history.

(56) References Cited

FOREIGN PATENT DOCUMENTS

| | | |
|---|---|---|
| KR | 20-0268533 | 3/2002 |
| KR | 10-2005-0119854 | 12/2005 |
| KR | 10-0591541 | 6/2006 |
| KR | 10-2014-0022049 | 2/2014 |
| KR | 10-1557372 | 10/2015 |
| KR | 10-1625669 | 6/2016 |

OTHER PUBLICATIONS

Translation of Rhu '541 (KR100591541B1) (Year: 2006).*
Translation of Rhu '669 (KR101625669B1) (Year: 2016).*
English Specification of 10-0591541.
English Specification of 10-1625669.
English Specification of 10-1557372.
English Specification of JP2005-262009A.
English Specification of JP2000-084309A.
English Specification of 20-0268533.
English Specification of 10-2014-0022049.
English Specification of CN206008131U.
English Specification of 10-2005-0119854.

* cited by examiner (a)　　　　　　　　　　　　(b)

FIG. 8

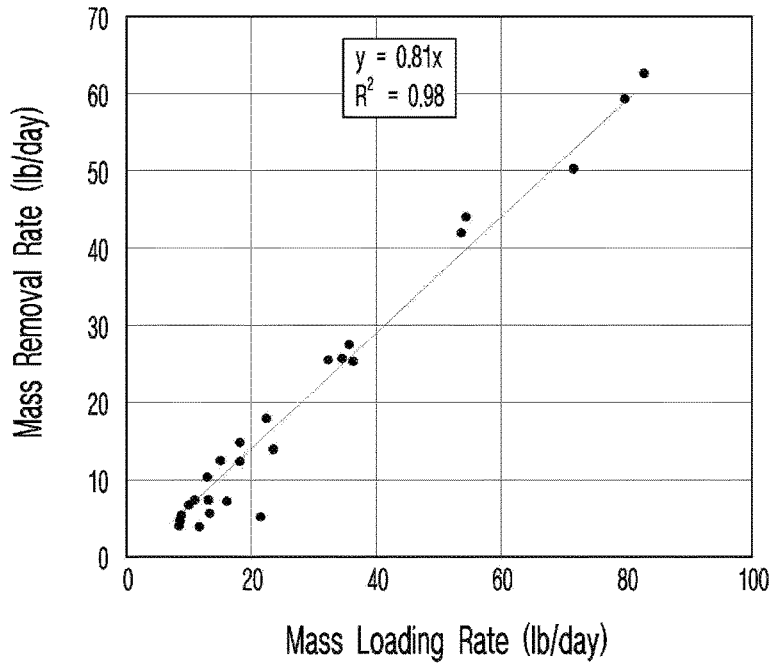

FIG. 9

```
START
  ↓
DISTRIBUTE INTRODUCED WASTEWATER UPWARD — S910
  ↓
FILTER SOLID IN WASTEWATER UPWARD — S920
  ↓
REMOVE FINE SOLID AND ORGANIC IN WASTEWATER
FROM WHICH SOLID IS FILTERED — S930
  ↓
STORE TREATMENT WATER IN WHICH EACH COMPONENT
IS FILTERED OR DISCHARGE IT TO OUTSIDE — S940
  ↓
SPRAY BACKWASH WATER DOWNWARD — S950
  ↓
DISCHARGE BACKWASH WATER THAT HAS PASSED
THROUGH FILTER MEDIA TO OUTSIDE — S960
  ↓
END
```

(a)  (b)

FIG. 16
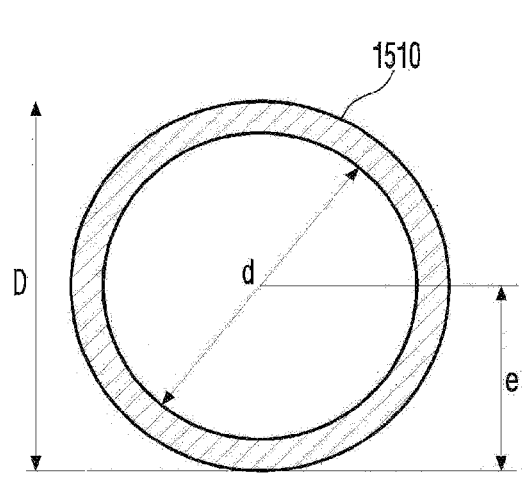
(a)
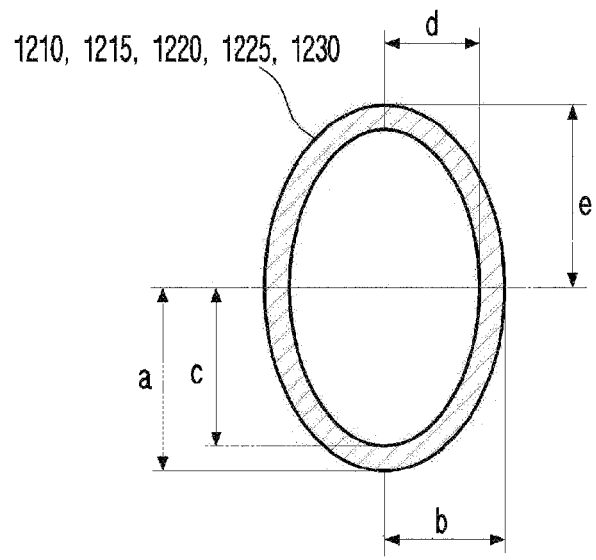
(b)

ns for wastewater filtration. It is necessary to treat properly the initial stormwater generated during rainfall because the pollution load caused by rainfall continuously increases. The initial stormwater has a high flow rate, but relatively low pollutants compared to sewage, and the concentration of pollutants changes over time. The research results shows that the flow rate is low, but the concentrations of total biochemical oxygen demand (TBOD) and total suspended solid (TSS) are high at the beginning of the rainfall, but the concentration of BOD and TSS decreases as the flow rate increases due to the dilution effect. It is known that the initial stormwater is irregular and intermittent, but it is a cause of deterioration of the water quality of the discharged water body because the accumulated pollutants in sewer line are discharged at once.

Settling and filtration processes are used to treat stormwater. It is known that the settling process can remove quickly suspended solid matter (SS) by increasing the settling velocity with adding coagulant and flocculant. However, it is known that the flow rate and water quality of the initial stormwater change rapidly with time, so it is challenging to maintain proper coagulation conditions in the actual field. The filtration process can effectively remove solids even when the flow rate fluctuates widely. However, it has a disadvantage because the backwash cycle to remove the solids trapped in the media increases when the solids load increases. In particular, the filtration technology using a single filter medium has a limitation because the filtration duration is shortened because solids are stocked at the filter media located on the inlet side.

Settling and filtration processes are physical treatment processes that can effectively remove solids, but it is difficult to remove dissolved pollutants from wastewater, such as SBOD (soluble BOD).

Therefore, an alternative is a biological aerated filter (BAF) process to economically and efficiently remove not only solids but also dissolved organic matter such as SBOD from the stormwater.

Conventional biofiltration processes have filtered stormwater using packed media (sunken media). The biofiltration process using sunken media can flow up and down. In the biological filtration process using sunken media, backwashing is performed by supplying backwash water and backwashing air. However, additional energy is consumed since a large-capacity backwash water supply pump is required to expand the filter medium. Since the solids trapped at the bottom must also be removed to the top through the expansion of the filter media in the upward flow, it has a disadvantage that a separate pretreatment process is essential to remove the solids in the influent when the influent suspended solids concentration is high.

DISCLOSURE

Technical Problem

An embodiment of the present invention has an object to provide a wastewater filtration device and method capable of stable and efficient operation by minimizing the head loss while simultaneously removing organics and solids in high-flow wastewater.

Technical Solution

According to one aspect of the present invention, the present invention provides a filtration device for treating wastewater, the device comprising: a distribution channel for distributing an incoming wastewater vertically upward or discharging backwash water, received vertically downward, to the outside; filter media for raising due to a lower specific gravity than water when the wastewater is distributed vertically upward from the distribution channel to filter solids and organics in the wastewater and descending when the backwash water flows in vertically downward to remove the attached solids and organics; and a treated water storage tank for receiving the treated water from which solids and organics are removed through the filter media and discharging it to the outside or discharging the backwash water flowing in from the outside to the filter media.

According to one aspect of the present invention, the filtration device is characterized by further comprising a nozzle for being disposed at one end of the treated water storage tank, having a plurality of outlets smaller than the filter media, and receiving or discharging wastewater or backwash water.

According to one aspect of the present invention, the filter media is characterized by comprising at least two types of filter media having different sizes.

According to one aspect of the present invention, it is characterized in that the filter media having a relatively larger size receive a greater buoyancy than the filter media having a relatively smaller size by the wastewater distributed vertically upward by the distribution channel.

According to one aspect of the present invention, the present invention provides a filtration method of wastewater by a wastewater filtration device, the method being characterized by comprising: a distribution process for distributing the incoming wastewater vertically upward; a first filtration process for filtering solids in the distributed wastewater; a second filtration process for filtering fine solids and organics from wastewater from which solids are filtered; a discharge process for storing each component-filtered treated water or discharging it to the outside; and a spraying process for spraying backwash water vertically downward.

According to one aspect of the present invention, it is characterized in that the first filtration process and the second filtration process are carried out by filter media.

According to one aspect of the present invention, the filter media is characterized by comprising at least two types of filter media having different sizes.

According to one aspect of the present invention, it is characterized in that the filter media having a relatively larger size receive a greater buoyancy than the filter media having a relatively smaller size by the wastewater distributed vertically upward by the distribution channel, thereby performing the first filtration process with the filter media having a relatively smaller size and performing the second filtration process with the filter media having a relatively larger size.

Advantageous Effects

As described above, according to one aspect of the present invention, there is an advantage to allow stable and efficient operation by minimizing the head loss while simultaneously removing organics and solids from high flow wastewater.

DESCRIPTION OF DRAWINGS

FIG. 8 is a graph illustrating the SBOD removal rate the wastewater filtration device according to an embodiment of the present invention.

FIG. 9 is a flowchart illustrating a filtration method of the wastewater filtration device according to an embodiment of the present invention.

FIG. 16 is a view illustrating the size of a conventional diffuser and a diffuser according to an embodiment of the present invention.

MODE FOR INVENTION

Figure 1:
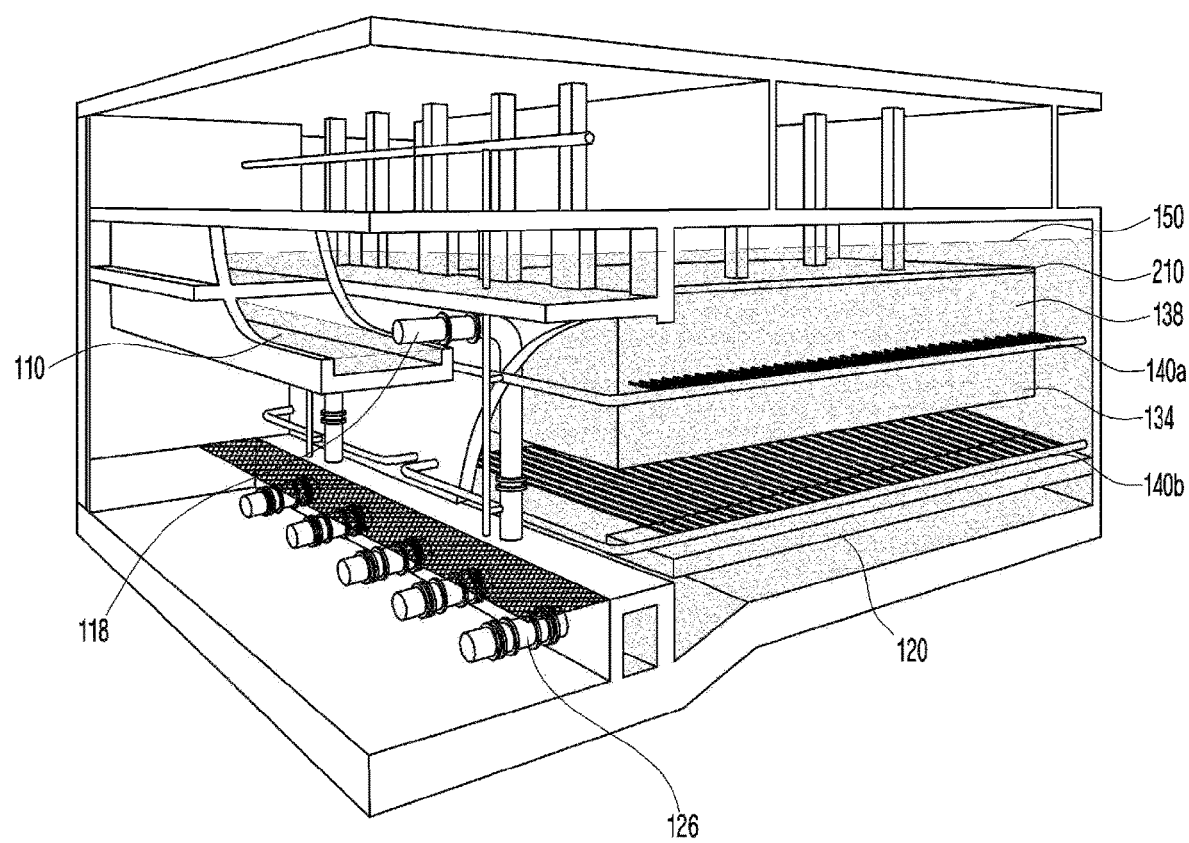
FIG. 1 is a perspective view illustrating a wastewater filtration device according to an embodiment of the present invention.

Various modifications may be made to the present invention, and the present invention may have various embodiments. Specific embodiments are illustrated in the drawings and described in detail. However, it should be understood that this is not intended to limit the present invention to specific embodiments, and all modifications, equivalents and substitutes included in the spirit and scope of the present invention are included. In describing each figure, like reference numerals have been used for like elements.

Terms such as first, second, A, and B may be used to describe various elements, but the elements should not be limited by the terms. The above terms are used only for the purpose of distinguishing one element from another. For example, without departing from the scope of the present invention, a first component may be referred to as a second component, and similarly, a second component may also be referred to as a first component. Term "and/or" includes a combination of a plurality of related listed items or any of a plurality of related listed items.

When a component is referred to as being "coupled" or "connected" to another component, it is understood that the component may be directly coupled or connected to another component, but other components may exist in therebetween. On the other hand, when it is said that a component is "directly coupled" or "directly connected" to another component, it should be understood that no other component is present in the middle.

The terms used in the present application are only used to describe specific embodiments and are not intended to limit the present invention. The singular expression includes the plural expression unless the context clearly dictates otherwise. It should be understood that terms such as "comprise" or "have" in the present application do not preclude the possibility of addition or existence of features, numbers, steps, operations, components, parts, or combinations thereof described in the specification in advance.

Unless defined otherwise, all terms used herein, including technical and scientific terms, have the same meaning as commonly understood by one of ordinary skill in the art to which this invention belongs.

Terms such as those defined in a commonly used dictionary should be interpreted as having a meaning consistent with the meaning in the context of the related art and should not be interpreted in an ideal or excessively formal meaning unless explicitly defined in the present application.

Further, each configuration, step, process or method included in each embodiment of the present invention may be shared within a range that does not technically contradict each other.

Figure 2:
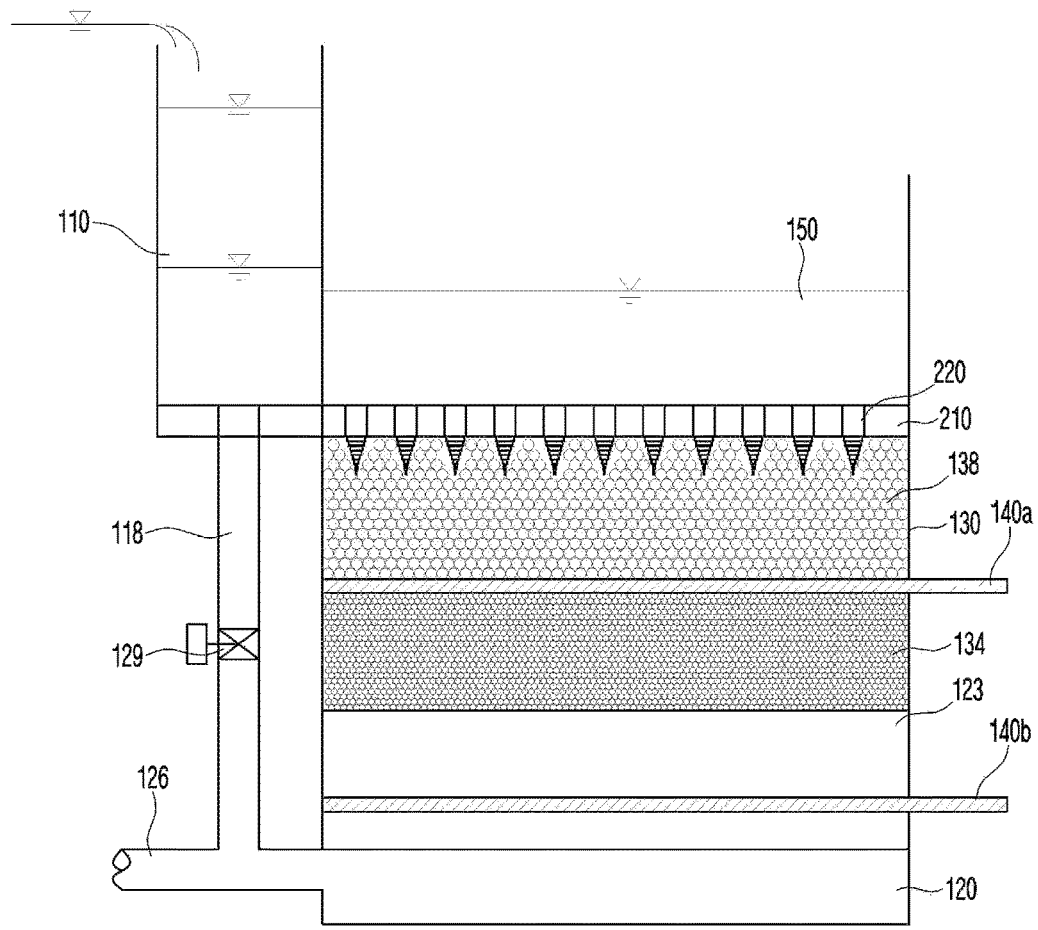
FIG. 2 is a cross-sectional view illustrating a wastewater filtration device according to an embodiment of the present invention.
Figure 3:
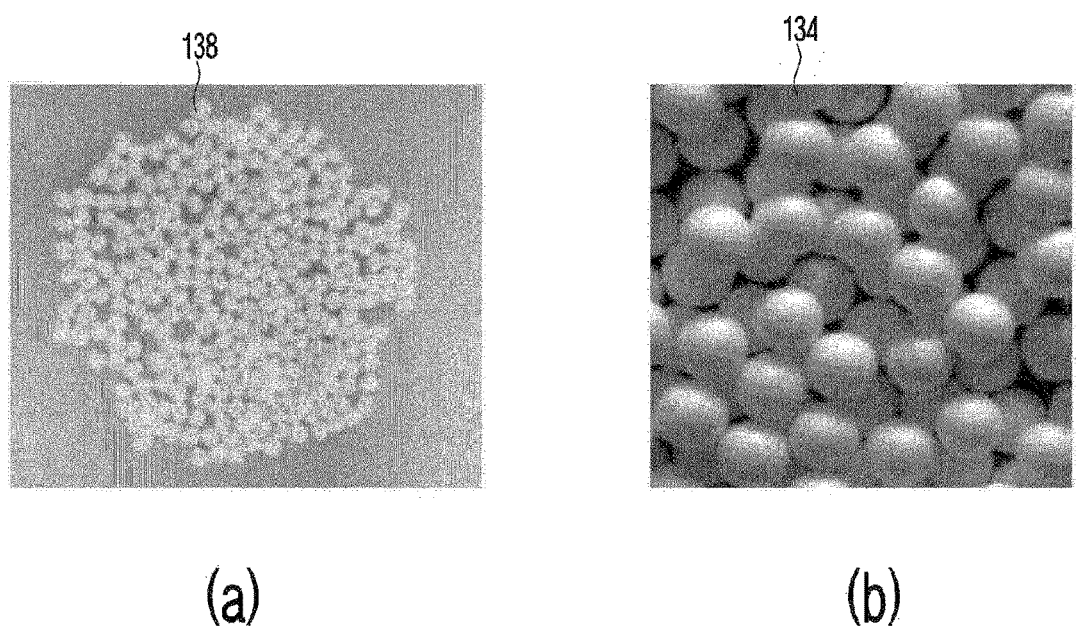
FIG. 3 is a view showing filter media according to an embodiment of the present invention.

FIG. 1 is a perspective view illustrating wastewater filtration device according to an embodiment of the present invention. FIG. 2 is a cross-sectional view illustrating a wastewater filtration device according to an embodiment of the present invention. FIG. 3 is a view showing filter media according to an embodiment of the present invention.

Referring to FIG. 1 and FIG. 2, the wastewater filtration device 100, in an embodiment of the present invention, comprises an inflow water tank 110, a distribution channel 120, filter media 134 and 138, diffusers 140a and 140b, a treated water storage tank 150, a strainer block 210, a nozzle 220 and a controller (not shown).

The filtration device 100 performs an up-flow biological filtration process, including flotation filter media. The wastewater filtration device 100 performs both physical filtration by the flotation filter media and biological treatment by microorganisms proliferated in the flotation filter media layer.

The inflow water box 110 receives to-be-treated wastewater from the outside. The inflow water box 110 receives wastewater from the outside and delivers the wastewater introduced through the inflow pipe 118 to the distribution channel 120. One or more inflow water channels may be provided according to the throughput.

The distribution channel 120 distributes the wastewater flowing through the inlet water box 110 vertically upward or receives backwash water vertically downward and discharges it outside.

Wastewater passing through the inflow pipe 118 is introduced into the distribution channel 120. The distribution channel 120 receives and distributes the wastewater vertically upward (the direction in which the filter media 134 and 138 exist). The distribution channel 120 may unevenly spray the wastewater vertically upward, but in order to improve the filtration efficiency, the wastewater is evenly distributed and discharged vertically. When receiving wastewater and trying to distribute it vertically upward, the distribution water channel 120 opens the inflow valve 129 to allow wastewater to flow in and closes the discharge valve to prevent the inflowed wastewater from being discharged to the outside.

Conversely, the distribution water channel 120 receives the backwash water vertically downward and discharges it to the outside. When the wastewater filtration has been performed for a certain period, cleaning of the filter media 134 and 138 should be performed. Such backwashing proceeds as the backwash water is discharged from the treated water storage tank 150 to the filter media 134 and 138 through the nozzle 220. The distribution water channel 120 closes the inflow valve 129 and opens the discharge valve 126 so that the introduced backwash water is discharged to the outside.

The filter media 134 and 138 physically remove solids from the incoming wastewater and, at the same time, biologically remove organics as well.

The filter media 134 and 138 have a smaller specific gravity than water and ascend together with the wastewater when the wastewater inflows. The filter media 134 and 138 ascend together to the height at which the strainer block 210 is located and cannot ascend further by the strainer block 210, and layers separate according to their size and begin to clump together. The clumped media 134 and 138 remove solids or organics depending on the size. Meanwhile, when the backwash water is discharged from the treated water storage tank 150 and inflows into the reaction tank 130 for backwashing the filter media 134 and 138, the filter media 134 and 138 are cleaned by washing out substances accumulated during filtration according to their size.

The wastewater filtration device 100 includes at least two types of filter media 134 and 138 having different sizes (volumes). When the wastewater distributed from the distribution channel 120 flows into the reaction tank 130, the wastewater is distributed vertically upward, so each filter medium is buoyant in the wastewater. At this time, the filter media having different sizes receive different buoyancy forces by the wastewater, as shown in the following formula.

$$B = \rho V g$$

Here, B represents the buoyancy force, p represents the density of the fluid, V represents the volume of an object submerged in the fluid, and g represents the acceleration due to gravity. At this time, the density and gravitational acceleration of the fluid is constant, so the factor that has a decisive influence on the buoyancy of the filter media is the particle volume. Accordingly, as the volume of the particles increases, they are more affected by the buoyancy force to be arranged relatively densely at the top.

Conversely, when the backwash water inflows into the reaction tank 130, the small-sized filter media have a relatively large volume expansion rate by the backwash water because the upward velocity due to the buoyancy is small. On the other hand, the large-sized filter media have a relatively small volume expansion rate by backwash water because the upward velocity due to buoyancy is large.

According to the above description, although filter media having different sizes are randomly arranged in the reaction tank 130, the layers in which the filter media are present are naturally classified according to their size by the inflow of wastewater or backwash water. Further, although the wastewater and the backwash water are introduced in different directions, the phenomenon in which the layers of the filter media are reversed does not occur due to the above-described reason.

As shown in FIG. 3A, the amount of buoyancy acting as the filter media 134 is relatively small, and the filter media 134 having a relatively small size, is disposed at the (relatively) lower end of the reaction tank 130. The diameter of the filter media 134 may be 3.0 mm to 8.0 mm, and the filter media 134 may be disposed at the height of 0.5 to 2.0 m. As such, the filter media 134 having a relatively small diameter makes fine pores to remove solids in the wastewater. Meanwhile, when the backwash water flows into the filter media 134, the filter media 134 exhibits a relatively large volume expansion rate due to a relatively small amount of buoyancy. For example, the filter media 134 may expand by 50% to 100% of the volume when the backwash water is introduced compared to the volume when the wastewater is introduced. When the backwash water is introduced, the filter media 134 expand relatively much in volume, so the solids filtered by the filter media are efficiently detached and discharged together with the backwash water.

Meanwhile, as shown in FIG. 3B, the amount of buoyancy acting as the filter media 138 is relatively large, and the filter media 138 having a relatively large size, is disposed at the (relatively) upper end of the reaction tank 130. The diameter of the filter media 138 may be 4.0 mm to 10.0 mm, and the filter media 138 may be disposed at the height of 2.0 to 3.5 m. Since the filter media 138 have a relatively large size, it has a relatively large number of pores compared to the filter media 134. Accordingly, aerobic microorganisms for decomposing organics in wastewater are attached to the surface of the filter media 138 to be grown smoothly. The filter media 138 uses aerobic microorganisms grown on its surface to remove relatively small-sized solids and dissolved organics that are not removed even by the filter media 134 from the wastewater. Meanwhile, when the backwash water is introduced, the filter media 138 desorbs the microbial film (formed on the surface) from which the solids and organics are removed using the washing air and the shear force of the wash water. The detached microorganisms are discharged together with the backwash water and washing air.

The diffuser 140a and 140b supply washing air for the growth of microorganisms or to clean the filter media 134 and 138.

The diffuser 140a is disposed in the reaction tank 130 to supply oxygen to the filter media 138. The diffuser 140a may be disposed at a position where the filter media 138 ascends and forms a layer in the reaction tank 130 by the inflow of wastewater and mainly supplies oxygen to the filter media 138. Alternatively, the diffuser 140a may be disposed at a position where drag force is applied by wastewater, backwash water, or elevating and descending filter media in the reaction tank 130. The diffuser 140a supplies electron acceptors necessary for aerobic microorganisms to oxidize organics. The diffuser 140a may supply oxygen as an electron acceptor by supplying air but may also supply pure oxygen in some cases. According to the oxygen supply of the diffuser 140a, the filter media 138 may remove small-sized solids and dissolved organics that the filter media 134 could not remove using aerobic microorganisms.

Meanwhile, the diffuser 140*b* is disposed at an arbitrary position in the reaction tank 130 to supply washing air for cleaning the filter media 134 and 138. The solids or organics growing or adhering to the filter media 134 and 138 may be cleaned by backwash water, but in order to improve cleaning efficiency, the diffuser 140*b* may supply washing air together.

A description of the diffuser 140 is provided later with reference to FIG. 12, FIG. 13, FIG. 14, FIG. 15, and FIG. 16.

The treated water storage tank 150 receives the treated water passing through the filter media 134 and 138 and discharges it to the outside or receives the backwash water from the outside and discharges it to the filter media 134 and 138. The treated water from which contaminants (solids and organics) are filtered by the filter media 134 and 138 is introduced into the treated water storage tank 150 through the nozzle 220 or the strainer block 210 and the nozzle 220. In order to be used as backwash water in other wastewater filtration devices, the treated water storage tank 150 may discharge the treated water to a treated water storage tank of another wastewater filtration device. Alternatively, the treated water storage tank 150 may discharge the treated water or discharge it to another separate treatment device. Meanwhile, the treated water storage tank 150 receives backwash water from the outside. Here, the incoming backwash water may be treated water filtered by another wastewater filtration device.

The strainer block 210 spatially separates the reaction tank 130 and the treated water storage tank 150.

In the strainer block 210, nozzles 220 may be disposed at preset intervals. Similarly, fluids such as air or liquid pass through, but the filter media 138 does not pass through fine-sized holes, which are also formed in the nozzles 220. Accordingly, the nozzles 220 introduce the treated water (oxygen) into the treated water storage tank and spray the backwash water into the reaction tank 130. In particular, the nozzles 220 allow the backwash water to be sprayed at a speed greater than or equal to a preset reference value so that solids or organics growing or adhering to the filter media 134 and 138 can be smoothly washed.

The strainer block 210 is implemented with a material having a hydrophilic surface, such as concrete. The filter media 138 have an adhesive force by the microorganisms and mucus that have grown on the surface of the filter media until they are washed by backwash water. Accordingly, the filter media 138 may float due to the wastewater inflow and may be attached to the strainer block 210. However, when the filter media 138 have attached to the strainer block 210, it causes problems such as clogging. Thus, the attachment of the filter material 138 to the strainer block 210 should be prevented. When the nozzles 220 are densely arranged in the strainer block 210, this problem can be prevented, but in consideration of the structure or durability of the strainer block 210, the nozzles 220 cannot be arranged at a narrow interval less than a predetermined interval within the strainer block 210. Accordingly, there is a risk that the filter media 138 may be adhered to the gap between nozzles 220. To prevent this, the strainer block 210 includes the concavo-convex portion 230 in the space between the nozzles 220. The concavo-convex portion 230 is described later with reference to FIG. 10 and FIG. 11.

The controller (not shown) controls the inflow of wastewater into the inflow water box 110, the inflow of backwash water into the treated water storage tank 150, and the inflow of oxygen into the diffuser 140.

The controller (not shown) controls the discharge valve 126 and the inflow valve 129 to control the inflow of wastewater into the inflow water box 110 or the discharge of backwash water.

The controller (not shown) controls the inflow supply of the backwash water into the treated water storage tank 150 and the injection of the backwash water. Wastewater is introduced into the reaction tank 130 by solids or organics that grow or attach on the filter media 134 and 138 to cause a head loss. Accordingly, the controller (not shown) measures the inflow pressure of wastewater with a pressure gauge (not shown) disposed in the reaction tank 130 to determine whether it reaches to a preset reference value. When the inflow pressure of the wastewater has reached to a preset reference value, it means that the number of solids or organics grown or attached to the filter media 134 and 138 has increased excessively, so it is the time when backwashing is necessary. Accordingly, the controller (not shown) controls to close the inflow valve 129 to block the inflow of wastewater and open the discharge valve 126 to introduce and discharge backwash water (pre-treated treatment water or treatment water from other wastewater filtration device) and controls the nozzles 220 to spray the backwash water.

The controller (not shown) opens the oxygen supply valve 145*a* and closes the washing air supply valve 145*b* so that the diffuser 140*a* supplies oxygen to the filter media 138 in the process of filtering according to the inflow of wastewater. On the other hand, the controller (not shown) opens the washing air supply valve 145*b* and closes the oxygen supply valve 145*a* so that the diffuser 140*b* supplies the washing air to the reaction tank 130 in the process of backwashing the filter media 134 and 138.

Figure 4:
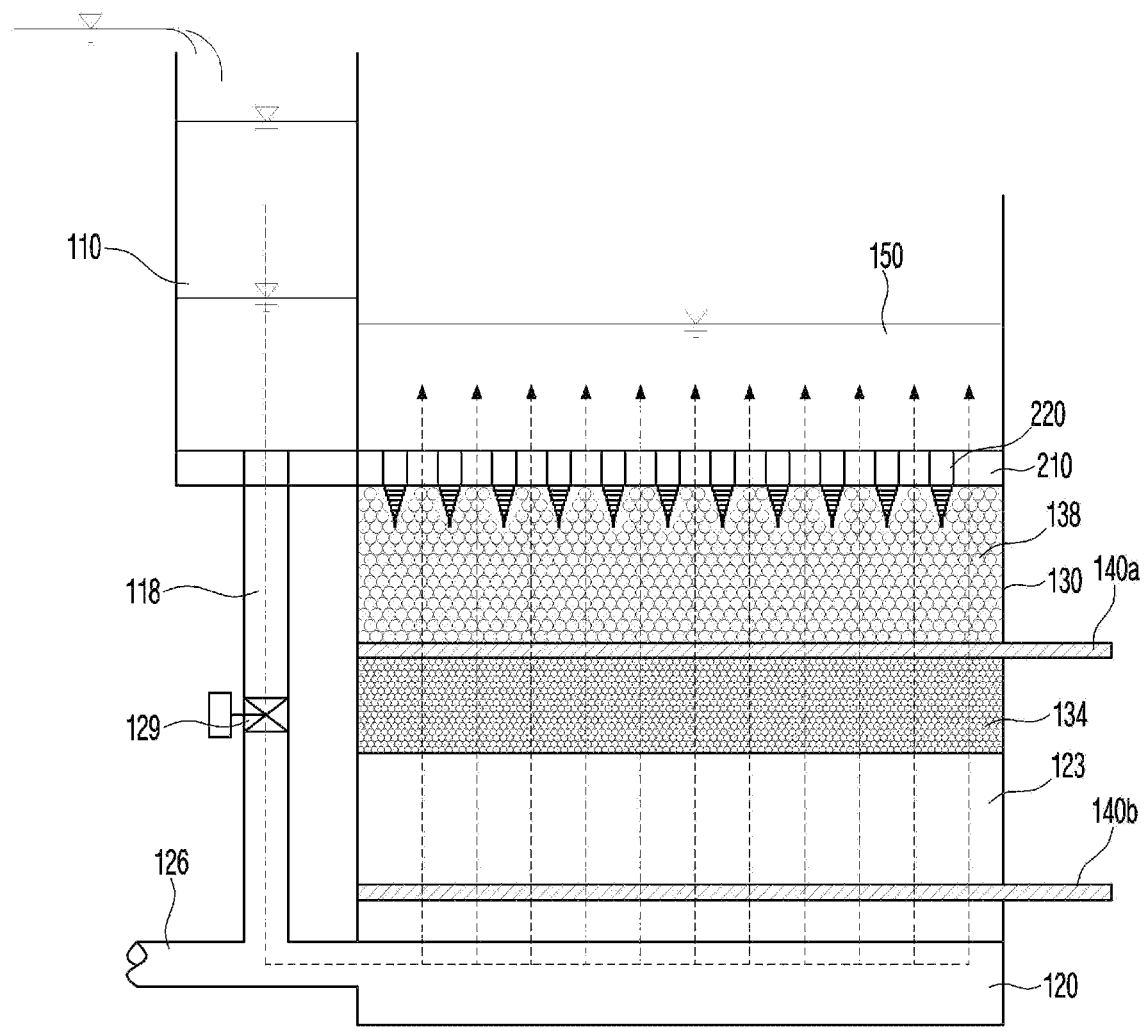
FIG. 4 is a schematic view illustrating a state in which wastewater are introduced into the wastewater filtration device according to an embodiment of the present invention.

FIG. 4 is a schematic view illustrating a state in which wastewater are introduced into the wastewater filtration device according to an embodiment of the present invention.

The wastewater introduced into the inflow water box 110 are distributed vertically upward, where the filter media 134 and 138 are located, by the distribution channel 120. Accordingly, the filter media 134 and 138 are raised by the buoyancy force, and the filter media 138 receiving a relatively greater buoyancy, is arranged in a relatively upper layer, and the filter media 134 is relatively arranged in a lower layer. Relatively large solids in wastewater are filtered through the filter medium 134, and relatively small solids and organics in the wastewater are removed by microorganisms growing on the surface of the filter media 138 through the filter media 138. The treated water from which the contaminants are filtered passes through the strainer block 210 and the nozzle 220 and flows into the treated water storage tank 150. The introduced treated water storage tank 150 is used as backwash water for itself or other devices or discharged to the outside.

Figure 5:
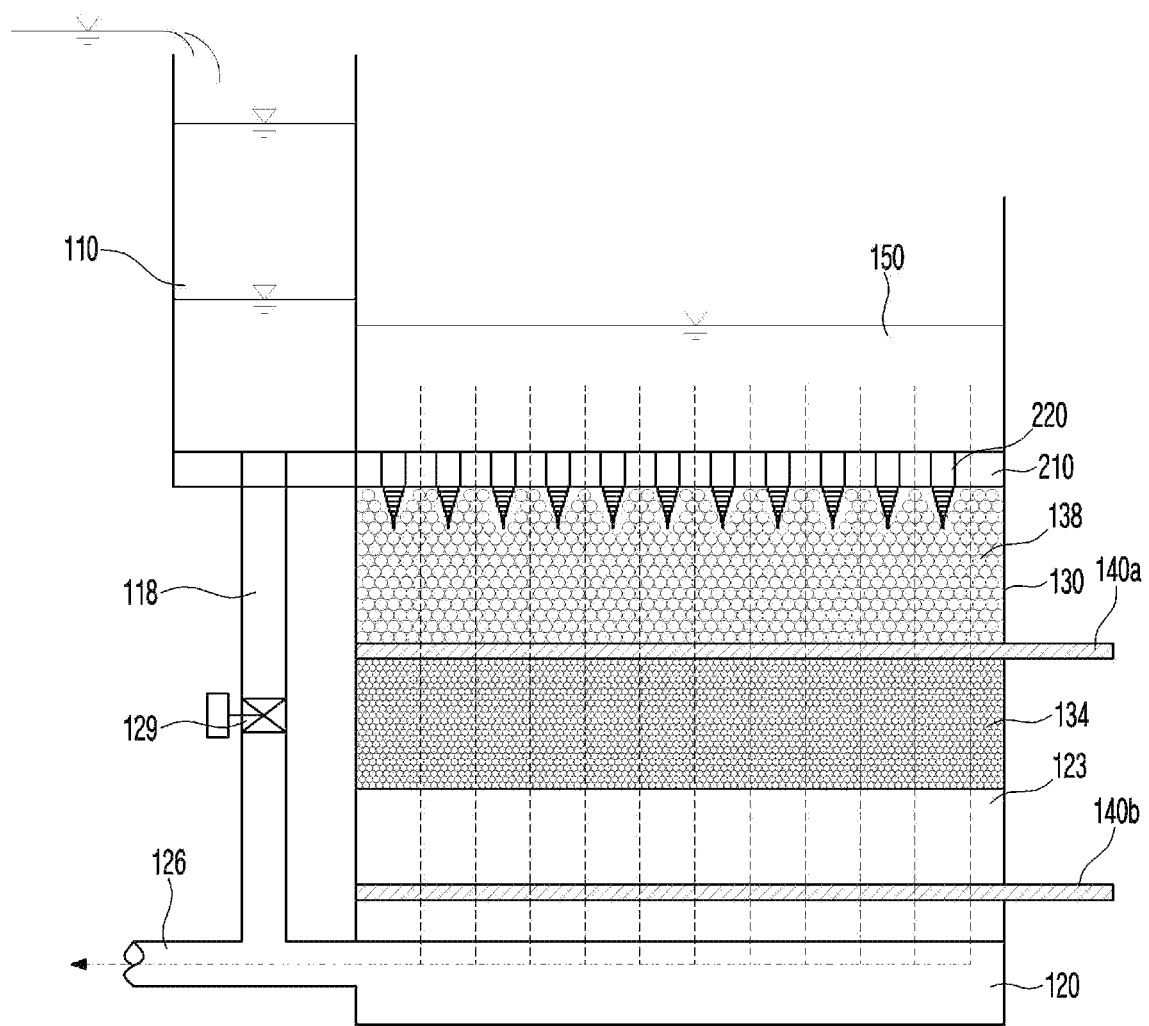
FIG. 5 is a schematic view illustrating a state in which backwash water is introduced into the wastewater filtration device according to an embodiment of the present invention.

FIG. 5 is a schematic view illustrating a state in which backwash water is introduced into the wastewater filtration device according to an embodiment of the present invention.

Meanwhile, backwashing is performed when the number of solids or organics growing or adhering to the filter media 134 and 138 increases, and the inflow pressure of the wastewater drops to a preset reference value. Backwash water is sprayed from the treated water storage tank 150 through the nozzle 220 to the reaction tank 130. At this time, the washing air may be discharged from the diffuser 140*b* therewith. For smooth backwashing of the filter media, backwash water may be sprayed at a rate of 60 m/hr to 120 m/hr, and washing air may be supplied at a rate of 10 m/hr to 40 m/hr. Solids or organics growing or attaching on the filter media 134 and 138 are detached by the supplied backwash water and washing air, and introduced into the distribution channel 120 with backwashing water. The introduced backwash water is discharged to the outside through the discharge valve 126. In this case, the solids detached from the filter media 134 may have a density heavier than water and a significantly smaller size. Accordingly, the solids do not float in the backwash water, so they can stay in the detached position without moving with the backwash water. In order to prevent these solids from remaining in the filter media, the process of cleaning the filter media using backwash water and washing air may be repeated a plurality of times.

Figure 6:
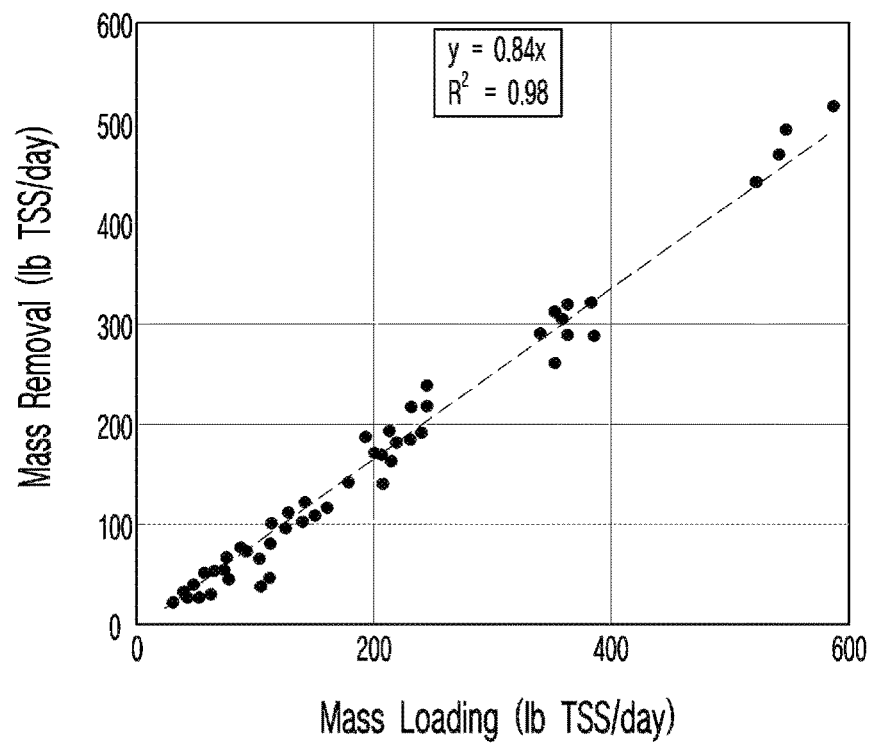
FIG. 6 is a graph illustrating the solids removal rate of the wastewater filtration device according to an embodiment of the present invention.
Figure 7:
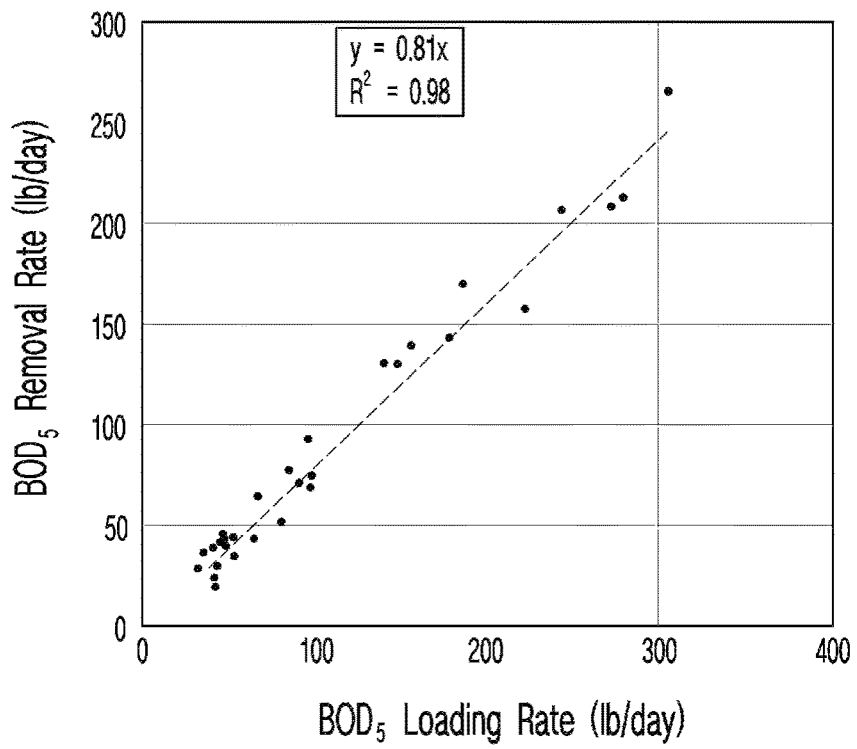
FIG. 7 is a graph illustrating the TBOD removal rate of the wastewater filtration device according to an embodiment of the present invention.

FIG. 6 is a graph illustrating the solids removal rate of the wastewater filtration device according to an embodiment of the present invention. FIG. 7 is a graph illustrating the TBOD removal rate of the wastewater filtration device according to an embodiment of the present invention. FIG. 8 is a graph illustrating the SBOD removal rate of the wastewater filtration device according to an embodiment of the present invention. The experimental environment is as follows.

The reaction tank 130 has a diameter of 1.2 meters, the filter media 134 are disposed at a depth of 1.0 meter, and the filter media 138 are disposed at a depth of 2.0 meters. Also, the height of the device was 5.5 meters. The wastewater was introduced into the device 100 and the residence time was 15 to 30 minutes. The washing air was supplied at 5.0 scfm, and the oxygen was supplied at a DO concentration of 5.0 to 8.0 mg/L.

Referring to FIG. 6, it was confirmed that the wastewater filtration device 100 removed 84% or more of the solids from influent wastewater.

Referring to FIG. 7, it was confirmed that the wastewater filtration device 100 reduced the BOD from influent wastewater by 810% or more. Further, it was confirmed that the maximum BOD removal rate of the wastewater filtration device 100 was 55.7 kgBOD/m3·d, which is about 10 times higher than the BOD removal rate of 5.5 kgBOD/m3·d, which is shown in the conventional filtration device. It was confirmed that the wastewater filtration device 100 might efficiently remove organics in a short time.

Referring to FIG. 8, it was confirmed that the wastewater filtration device 100 stably removes dissolved organic matters biologically about more than 74%.

FIG. 9 is a flowchart illustrating a filtration method of the wastewater filtration device according to an embodiment of the present invention.

The distribution channel 120 distributes the influent wastewater upward (S910).

The filter media 134 filter the solids from the wastewater upward (S920) The filter media 138 remove fine solids and organics of wastewater from which the solids are filtered (S930).

The treated water storage tank 150 stores or discharges the treated water in which each component is filtered (S940).

The treated water storage tank 150 sprays the backwash water downward (S950).

The distribution channel 120 discharges the backwash water passed through the filter media 134 and 138 to the outside (S960).

Figure 10:
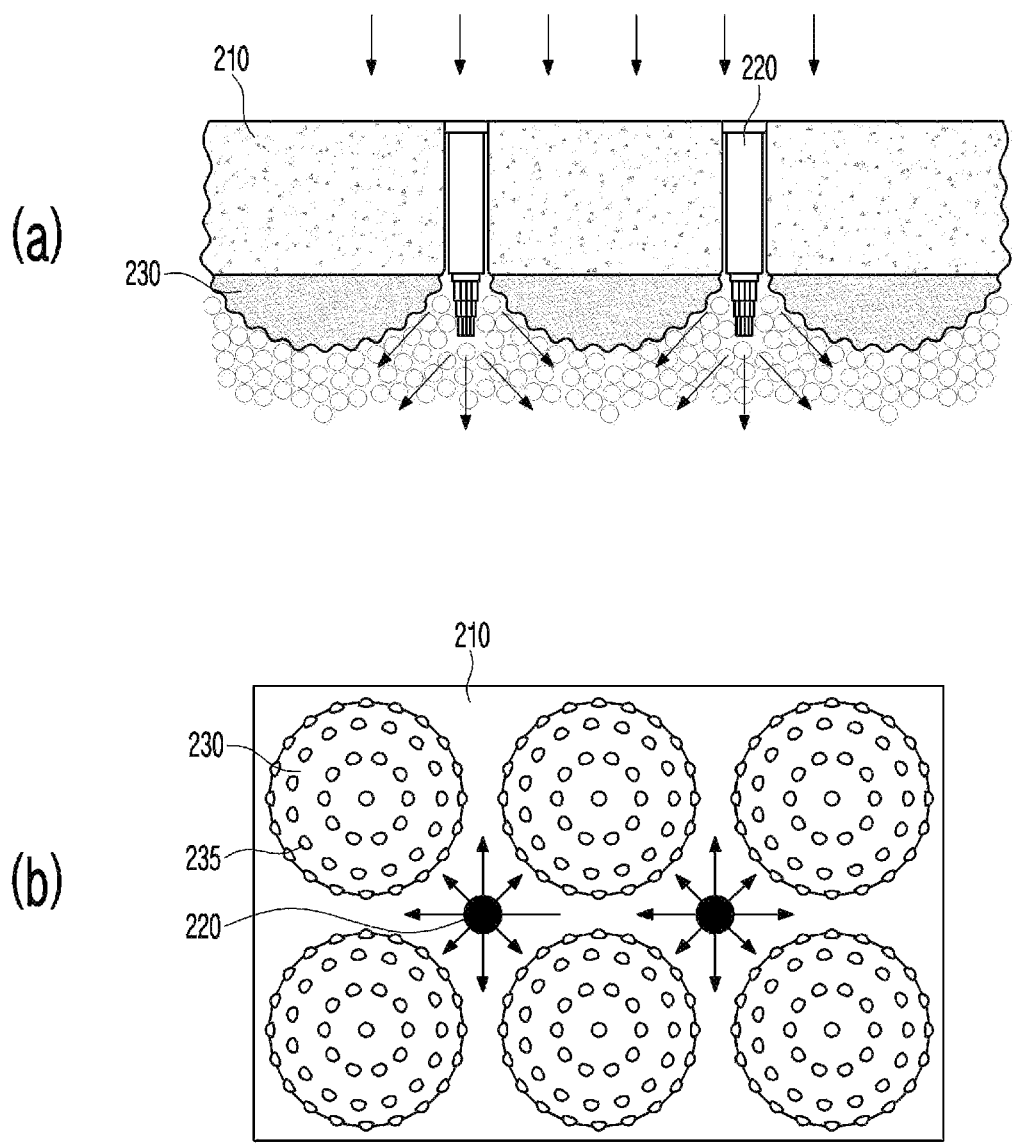
FIG. 10 is a cross-sectional view and a bottom view illustrating a strainer block and a nozzle according to an embodiment of the present invention.
Figure 11:
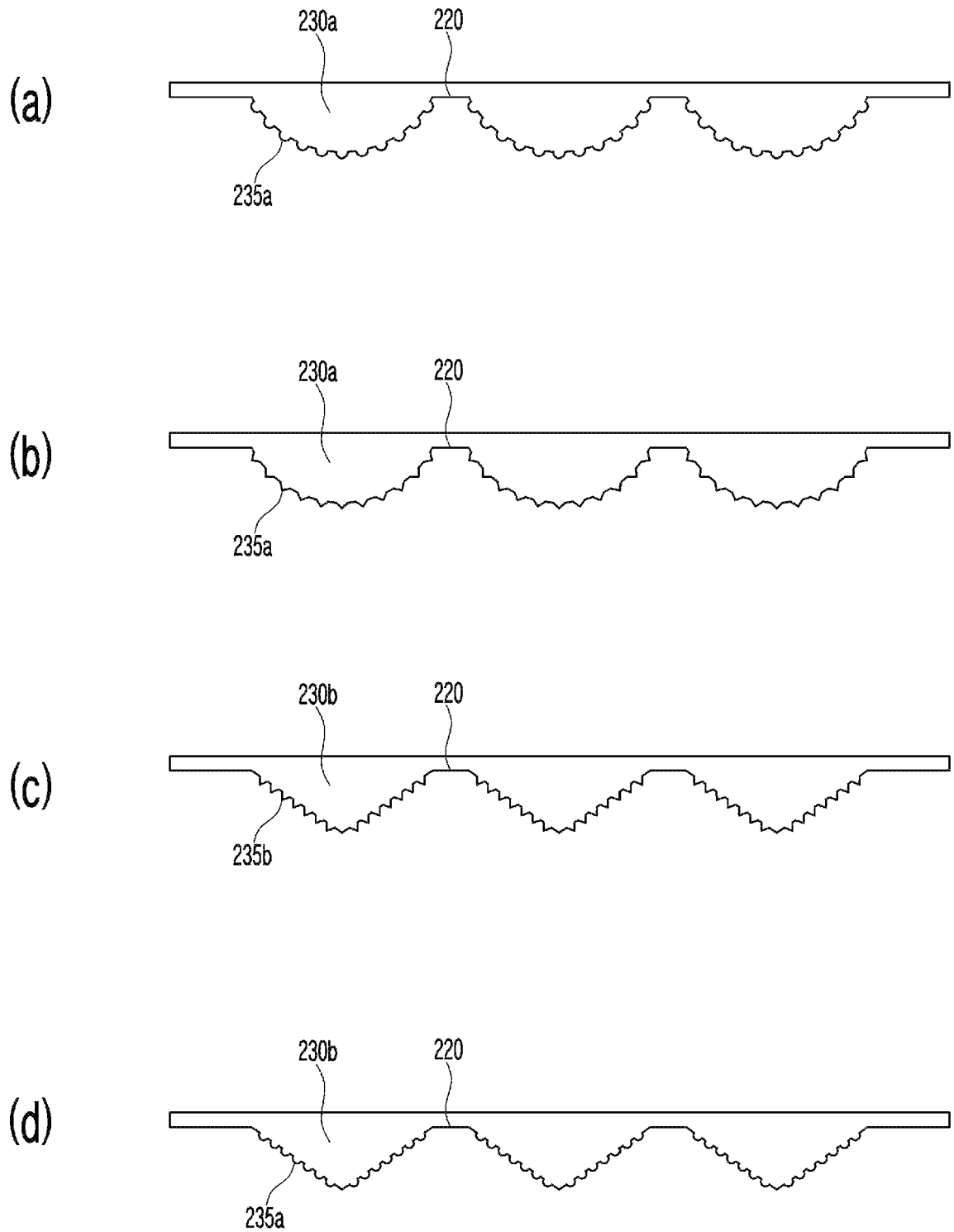
FIG. 11 is a cross-sectional view illustrating a strainer block according to various embodiments of the present invention.

FIG. 10 is a cross-sectional view and a bottom view illustrating a strainer block and a nozzle according to an embodiment of the present invention. FIG. 11 is a cross-sectional view illustrating a strainer block according to various embodiments of the present invention.

Referring to FIG. 10, the concavo-convex portion 230 is a portion protruding from the strainer block 210 between the nozzles 220. The concave-convex portion 230 is formed in the blind spot section where the backwash water cannot touch due to the spraying angle of the backwash water of the nozzle 220 and physically prevents the filter media 138 from attaching to the strainer block 210. The concave-convex portion 230 protrudes to a position where the backwash water may be sprayed onto the surface of the concave-convex portion 230 according to the spraying angle of the backwash water of the nozzles 220, so that the filter media 138 may be washed by the sprayed wash water although it is attached to the surface of the concave-convex portion 230. Furthermore, unlike the strainer block 210, the concave-convex portion 230 may be implemented with a material (the degree of adhesion of the filter media is relatively low compared to that of the strainer block) that is not easy for the filter media 138 to adhere thereto. As the concavo-convex portion 230 is implemented with the above-described material, it is possible to physically prevent the filter media 138 from attaching to the strainer block 210 as well as adhering to the concave-convex portion 230.

Since the concavo-convex portion 230 has a shape protruding from the strainer block 210, it does not have a structure that spatially surrounds the nozzles 220. Accordingly, although the concavo-convex portion 230 is formed in the strainer block 210, a passage through which backwash water can move may be formed between the nozzles 220 or between the concavo-convex portions 230. The adhesion of the filter media 138 is minimized by the concavo-convex portion and may be further minimized by backwash water moving between the nozzles 220 or between the concave-convex portions 230.

Furthermore, the concavo-convex portion 230 may further include protrusions 235 on the surface. As the protrusions 235 are formed on the surface of the concave-convex portion 230, the probability that the filter media 138 adhere to the concave-convex portion 230 is significantly reduced. In particular, the protrusions 235 are formed on the surface of the concavo-convex portion 230 at intervals smaller than the diameter of the filter media 138, thereby more effectively preventing the filter media 138 from adhering to the concave-convex portion 230. In particular, since the size of the filter media 138 is larger than the distance between the formed protrusions 235, the filter media 138 have not adhered between the protrusions 235, and adhesion to the concavo-convex portion 230 is prevented by the protrusions 235. For example, when the filter media have adhered between the protrusions, the protrusions may interfere with the path of backwash water, thereby reducing the backwashing efficiency of the filter media. The gap between the projections 235 is formed to be narrower than the size of the filter media 138, thereby addressing the above-described issue.

FIG. 10 illustrates that both the concave-convex portions 230 and the protrusions 235 are formed in a round (semicircle) shape, but the present invention is not limited thereto. As shown in FIG. 11B, FIG. 11C, and FIG. 11D, the concave-convex portions 230 may protrude in a triangular shape, and the protrusions 235 may protrude in a triangular shape regardless of the shape of the concave-convex portions 230.

Figure 12:
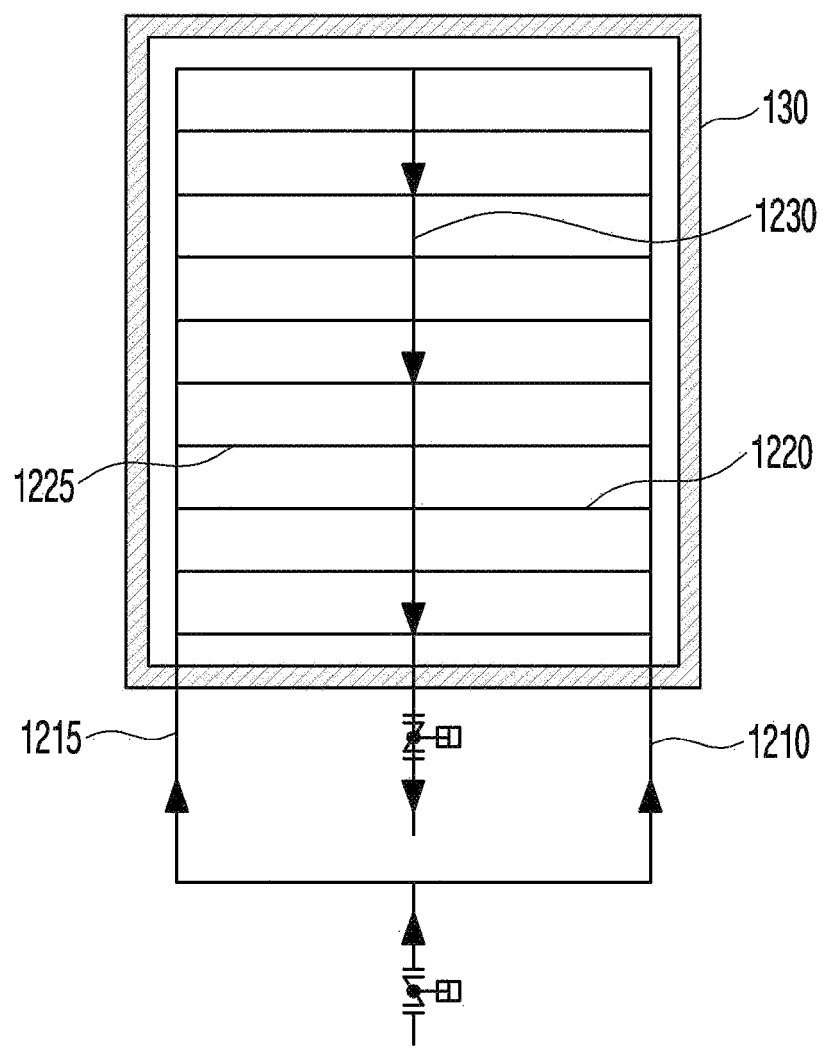
FIG. 12 is a plan view illustrating the diffuser according to the first embodiment of the present invention.
Figure 13:
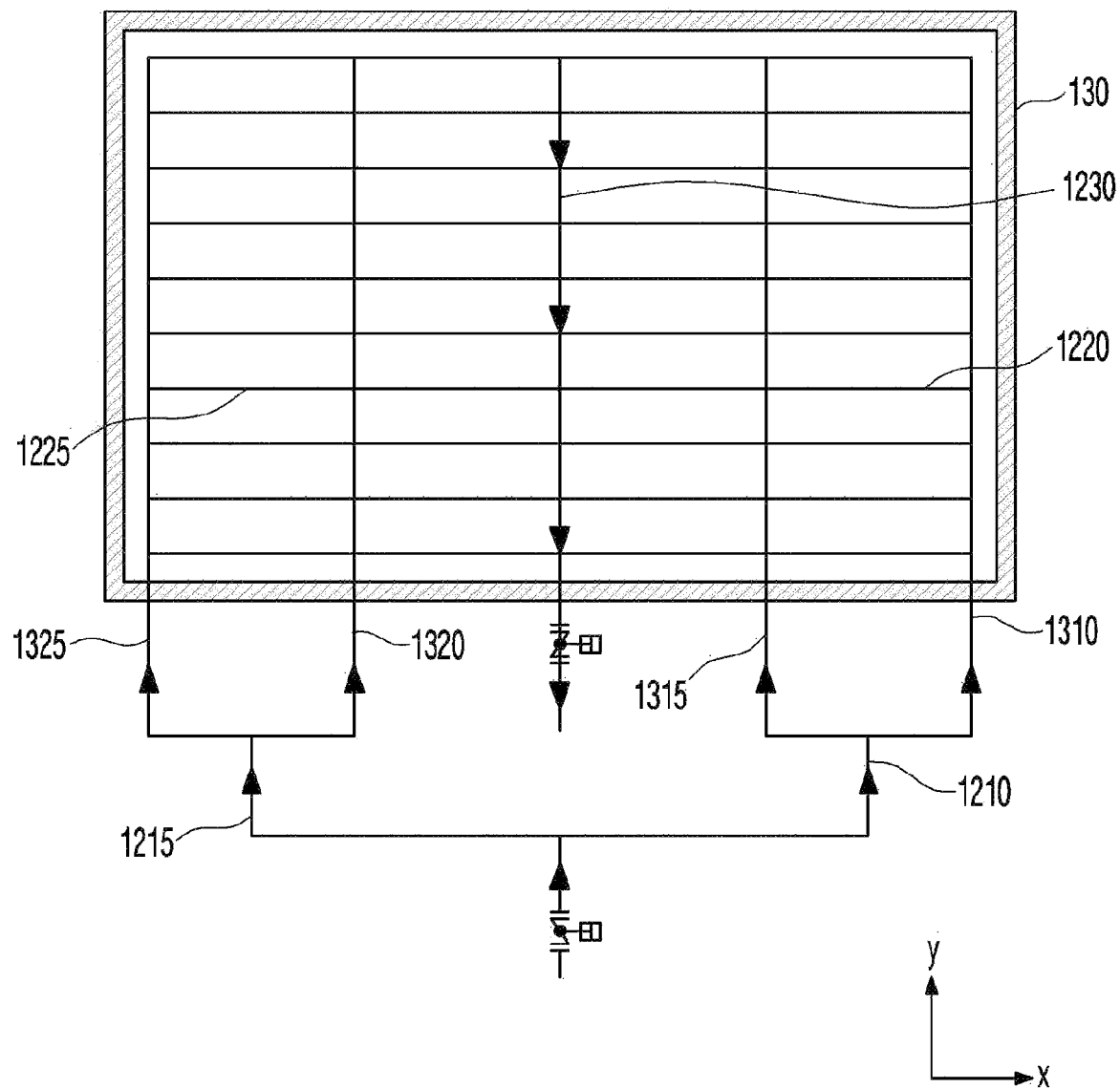
FIG. 13 is a plan view illustrating a diffuser according to a second embodiment of the present invention.

FIG. 12 is a plan view illustrating the diffuser according to the first embodiment of the present invention. FIG. 13 is a plan view illustrating a diffuser according to a second embodiment of the present invention.

Referring to FIG. 12, the diffuser 140, according to the first embodiment of the present invention, includes the first main pipes 1210 and 1215, branch pipes 1220 and 1225, and a second main pipe 1230.

The diffuser 140 is disposed at the outside of the reaction tank 130 or a position separated by a preset distance from the outside of the reaction tank 130 into the reaction tank 130. The diffuser 140 is disposed at the corresponding position and supplies air for the growth of microorganisms or washing into the reaction tank 130.

An outlet for supplying air into the reaction tank 130 is formed in the diffuser. At this time, when the supply of air is stopped, wastewater or backwash water (hereinafter, referred to as "water") in the reaction tank 130 is introduced to the outlet temporarily or continuously. The water introduced into the diffuser prevents the air from being released to the outlet again later, thereby preventing sufficient air for microbial growth or washing into the reaction tank 130 and increasing the pressure in the diffuser and the pressure of the incoming air.

In order to address these issues, the diffuser 140 comprises the first main pipes 1210 and 1215 into which air is supplied to the reaction tank 130 or air for facilitating the discharge of water introduced into the diffuser 140 is injected, a second main pipe 1230 for discharging the air introduced into the first main pipes and the water introduced into the diffuser to the outside, and branch pipes 1220 and 1225 connecting the first main pipe and the second main pipe.

The first main pipes 1210 and 1215 introduce air from outside for supplying to the reaction tank 130 or discharging the water introduced into the diffuser 140. As the size of the reaction tank 130 increases, the size of the diffuser 140 also increases accordingly. As the size of the diffuser 140 increases, the amount of water introduced into the diffuser 140 also increases. Accordingly, when the amount and delivery speed of air introduced into the first main pipes 1210 and 1215 are improved, the discharge speed and efficiency of water passing through the first main pipes 1210 and 1215 may be improved. Accordingly, the first main pipes 1210 and 1215 are branched in a plurality of pipes, and the air is supplied to each of the first main pipes 1210 and 1215, respectively. The first main pipes 1210 and 1215 may be branched in an appropriate number according to the area of the diffuser 140, and the amount of air and the delivery speed are improved according to the number of branches.

The branch pipes 1220 and 1225 connect the first main pipes 1210 and 1215, respectively, and the second main pipe 1230. Each of the branch pipes 1220 and 1225 may connect each of the first main pipes 1210 and 1215, and the second main pipe 1230 as a single pipe, but a plurality of branch pipes at preset intervals may connect both pipes, respectively. In this way, since a plurality of branch pipes 1220 and 1225 connect both pipes at a predetermined interval, the diffuser 140 may have a stable structure, thereby improving water and air discharge efficiency. Since the plurality of branch pipes connect both the main pipes 1210, 1215, and 1230, it may have structural stability. Further, the plurality of branch pipes are arranged at regular intervals, so the air introduced into the first main pipes 1210 and 1215 and the water discharged by the introduced air pressure may be dispersed and introduced into the second main pipe 1230. If only one branch pipe connects the two main pipes, a considerable amount of pressure may be applied to the branch pipe or the connecting part of the main pipe to the branch pipe, depending on the amount of water and air introduced. To prevent this issue, a plurality of branch pipes 1220 and 1225 are installed at regular intervals, so water and air may be dispersed into each branch pipe and introduced into the second main pipe.

The second main pipe 1230 is disposed between the first main pipes 1210 and 1215, and discharges water and air passed through the branch pipe to the outside.

The second main pipe 1230 is disposed between the first main pipes 1210 and 1215. As described above, the first main pipes 1210 and 1215 are arranged to be branched into a plurality. The second main pipe 1230 is disposed between the branched first main pipes. As described above, the branch pipes 1220 and 1225 connect the first and second main pipes, and the lengths of the branch pipes 1220 and 1225 vary according to the arrangement of the first and second main pipes. As the length of the branch pipes 1220 and 1225 increases, the stability of the diffuser 140 decreases, and difficulties exist in manufacturing or connection (welding, etc.) with the main pipes. Accordingly, the second main pipe 1230 is disposed between the first main pipes 1210 and 1215 to minimize the length of the branch pipe.

The second main pipe 1230 discharges water and air introduced from each branch pipe to the outside. Unlike the first main pipe, only one second main pipe 1230 is installed. Since water and air flowing into the first main pipes, 1210 and 1215 are distributed and delivered by the plurality of branch pipes 1220 and 1225, the water introduced into the diffuser 140 may be discharged with a single main pipe 1230.

With this structure, the diffuser 140 may quickly discharge the water introduced therein.

FIG. 12 shows that the first main pipes are branched into two first main pipes 1210 and 1215 pipes, but the present invention is not limited thereto. As shown in FIG. 13, the first main pipes may be branched into four first main pipes 1310, 1315, 1320, and 1325 and may be branched into four or more main pipes. In this case, although the first main pipes are branched into several pipes, the second main pipe 1230 may be disposed in the middle of the first main pipes in order to minimize the length of the branch pipe.

Figure 14:
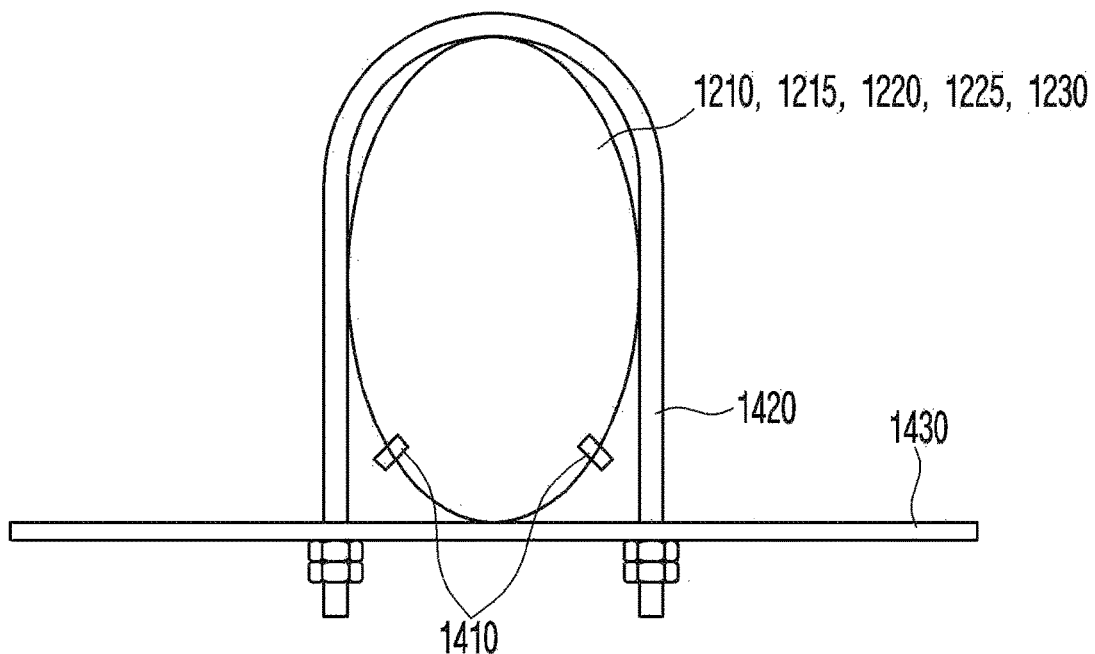
FIG. 14 is a cross-sectional view illustrating a main or branch pipe according to an embodiment of the present invention.
Figure 15:
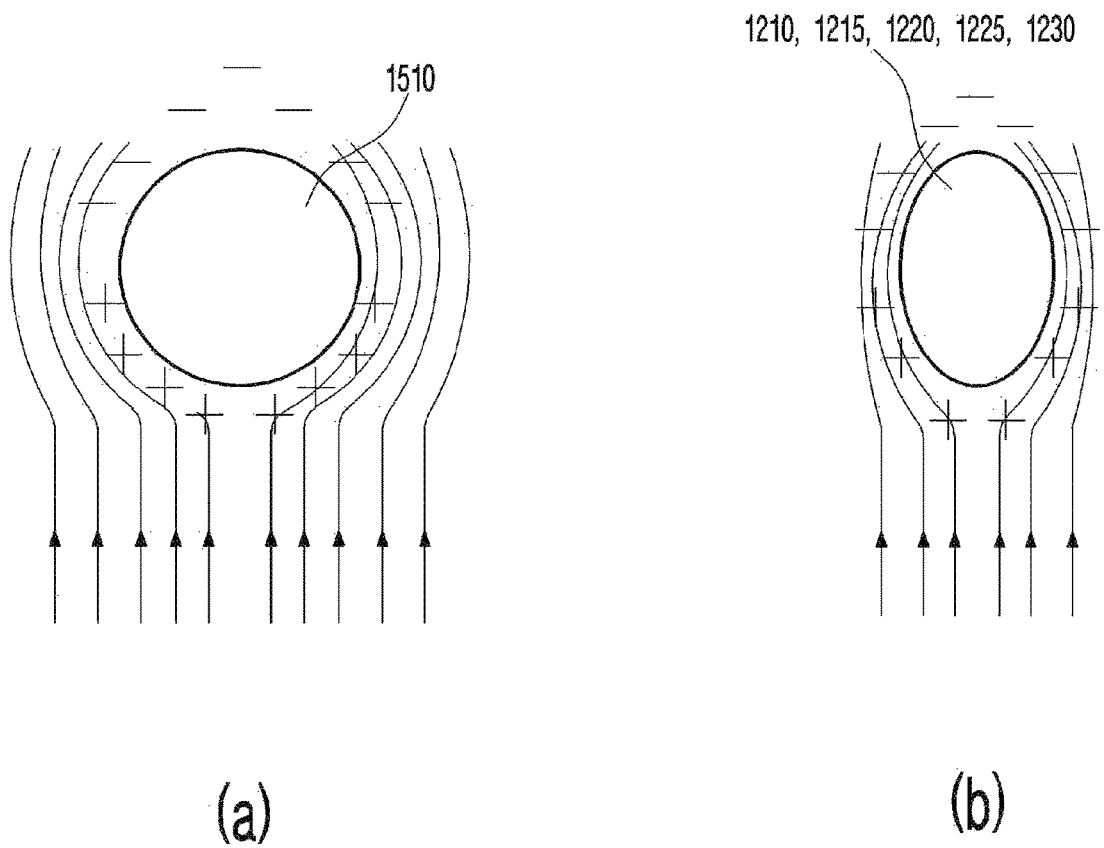
FIG. 15 is a view illustrating a drag force applied to a conventional diffuser and a diffuser according to an embodiment of the present invention.

FIG. 14 is a cross-sectional view illustrating a main or branch pipe according to an embodiment of the present invention. FIG. 15 is a view illustrating a drag force applied to a conventional diffuser and a diffuser according to an embodiment of the present invention. FIG. 16 is a view illustrating the size of a conventional diffuser and a diffuser according to an embodiment of the present invention.

Referring to FIG. 15, the main or branch pipes 1210 to 1230, according to an embodiment of the present invention, include an outlet 1410, a reinforcing support 1420, and a support 1430.

The main or branch pipes 1210 to 1230 introduce air for microbial growth, backwashing, or discharge of water from the outside. The main or branch pipes 1210 to 1230 have a hollow therein so that air flows into the inside to flow in one direction according to the applied pressure.

At this time, drag force is applied to the main or branch pipes 1210 to 1230 by the wastewater, backwash water, or filter media that ascends or descends. The drag force acting on the main or branch pipes 1210 to 1230 satisfies the following formula.

$$F_d = \frac{C_d A_p \rho_w v_p^2}{2}$$

Here, $F_d$ is the drag force, $C_d$ is the drag coefficient, $A_p$ is the area of action, $\rho_w$ is the density of the fluid, and $v_p$ is the velocity of the fluid. Typically, the main or branch pipe has a circular cross-sectional area. The main or branch pipes 1210 to 1230 have an elliptical, rather than circular, cross-sectional area to reduce the applied drag. The main or branch pipes 1210 to 1230 have a relatively reduced cross-sectional area in order to minimize the drag force applying to them from the fluid or the floating media. The cross-sectional area of the main or branch pipes 1210 to 1230 has an elliptical shape, and the major axis is arranged in the vertical direction (the direction in which the fluid or floating media ascends and descends), so that the working area of the main or branch pipes 1210 to 1230 may be significantly smaller. Compared with a conventional circular cross-sectional area, its working area can be reduced by half or more.

Referring to FIG. 15, a significant drag is applied to the conventional main or branch pipe 1510, while a half or more reduced drag is applied to the main or branch pipes 1210 to 1230 due to a reduction in the working area.

Referring back to FIG. 14, the main or branch pipes 1210 to 1230 have a relatively excellent secondary moment because they have the aforementioned cross-sectional area. Moment refers to the action of a force that tries to rotate an object, and its magnitude is calculated as the product of the force (F) and the distance from the axis of rotation to the line of action of the force (r). The secondary moment is proportional to the flexural strength of the pipe. Thus, the higher the secondary moment, the better the flexural strength of the pipe. The conventional piping and the main or branch pipes 1210 to 1230 may have the following secondary moment values depending on the shape of the cross-sectional area.

The conventional pipe 1510 having a circular-cross section, shown in FIG. 16A, has the following secondary moment values.

$$\frac{\pi(D^4 - d^4)}{32D}$$

On the other hand, the main or branch pipes 1210 to 1230 having an elliptical cross-section, shown in FIG. 16B, have the following secondary moment values.

$$\frac{\pi(a^2 b - c^3 d)}{4a}$$

As can be seen from the above-described secondary moment value, it is confirmed that the main or branch pipes 1210 to 1230 have a relatively large secondary moment value compared to the conventional pipe 1510. For example, when a 32 mm (10S) pipe of KS standard is applied, the secondary moment of the conventional pipe (circular cross-section) is 7.0 cm4, while the secondary moment of the main or branch pipes 1210 to 1230 is 11.9 cm4. This is about 1.7 times the improved value compared to that of the conventional pipe.

Referring back to FIG. 14, as the main or branch pipes 1210 to 1230 have an elliptical cross-sectional area, it is possible to lower the drag force received from the outside while having high bending strength (secondary moment). Accordingly, the main or branch pipes 1210 to 1230 may prevent deformation due to buoyancy caused by the ascending and descending fluid or frictional force with the descending fluid or the ascending and descending filter media.

The reinforcing support 1420 surrounds the main or branch pipes 1210 to 1230, and the support 1430 supports the main or branch pipes 1210 to 1230 under the main or branch pipes 1210 to 1230, respectively. The reinforcing support 1420 or support 1430 prevents the main or branch pipes 1210 to 1230 disposed by buoyancy caused by the ascending and descending fluid or frictional force with the descending fluid or the ascending and descending filter media from being deviated from their original positions. As described above, since the main or branch pipes 1210 to 1230 have a reduced area, the size of the-be-installed reinforcing support 1420 may be reduced. Accordingly, the amount of the-be-installed reinforcing support 1420 in the entire diffuser 140 may be significantly reduced. The reinforcing support 1420 and the support 1430 may be set as one set, and the respective sets may be disposed at a preset interval. When the reinforcing support 1420 and the support 1430 are closely arranged, the main or branch pipes 1210 to 1230 may be stably supported. However, the amount of to-be-installed set increases, and the drag force acting on the set, main, or branch pipe increases. Accordingly, the reinforcing support 1420 and the support 1430, respectively, may be disposed at a regular interval to support the main or branch pipes 1210 to 1230.

FIG. 9 shows that each process is sequentially executed. However, this is merely illustrative of the technical concept of an embodiment of the present invention. In other words, a person of ordinary skill in the art to which an embodiment of the present invention pertains may apply various modifications and variations, such as executing a change in the order described in each drawing or executing one or more processes among processes in parallel without departing from the essential characteristics of an embodiment of the present invention. Accordingly, FIG. 9 is not limited to chronological order.

Meanwhile, the processes shown in FIG. 9 can be implemented as computer-readable codes on a computer-readable recording medium. The computer-readable recording medium includes all kinds of recording devices in which data readable by a computer system is stored. That is, the computer-readable recording medium includes a magnetic storage medium (e.g., a ROM, a floppy disk, a hard disk, etc.) and an optical readable medium (e.g., a CD-ROM, a DVD, etc.). Further, the computer-readable recording medium is distributed in a network-connected computer system so that the computer-readable code can be stored and executed in a distributed manner.

The above description is merely illustrative of the technical idea of the present embodiment, and a person skilled in the art to which the present embodiment belongs may make various modifications and variations without departing from the essential characteristics of the present embodiment. Accordingly, the present embodiments are intended to explain rather than limit the technical spirit of the present embodiment, and the scope of the technical spirit of the present embodiment is not limited by these embodiments. The protection scope of the present embodiment should be interpreted by the following claims, and all technical ideas within the equivalent range should be interpreted as being included in the scope of the present embodiment.

CROSS-REFERENCE TO RELATED APPLICATION

This patent application claims priority in accordance with 35 U.S.C. § 119(a) of the U.S. Patent Act with respect to KR Patent Application Nos. 10-2020-0066398, 10-2020-

0066423, and 10-2020-006644, each filed in Korea on Jun. 2, 2020, all contents of which are incorporated herein by reference. Further, if this patent application claims priority for countries other than the United States for the same reason as above, all contents thereof are incorporated into this patent application by reference.

The invention claimed is:

1. A filtration device for treating wastewater, the device comprising: a distribution channel for distributing a wastewater vertically upward or discharging backwash water, received vertically downward, to outside of the filtration device; a floating filter media for raising due to having a lower specific gravity than water when the wastewater is distributed vertically upward from the distribution channel to filter solids and organics in the wastewater and descending when the backwash water flows in vertically downward to remove attached solids and organics; and a treated water storage tank for receiving the treated water from which solids and organics are removed through the filter media and discharging it to the outside of the filtration device or discharging the backwash water flowing in from the outside of the filtration device to the filter media by spraying, wherein the filter media comprises a first filter media and a second filter media having different sizes and has a lower specific gravity than water, and wherein a layer of the first filter media with a first diameter is disposed below a layer of the second filter media with a second diameter greater than the first diameter in a reaction tank, and the first filter media removes solids, and the second filter media removes dissolve organics in the wastewater using aerobic microorganisms grown on a surface of the second filter media.

2. The filtration device of claim 1, further comprising a nozzle for being disposed at one end of the treated water storage tank, having a plurality of outlets smaller than the filter media, and receiving or discharging wastewater or backwash water.

* * * * *